United States Patent

Cricchio et al.

[11] 3,900,465
[45] Aug. 19, 1975

[54] 3-FORMYLRIFAMYCIN AZINES
[75] Inventors: Renato Cricchio, Varese; Giancarlo Lancini, Pavia, both of Italy
[73] Assignee: Gruppo Lepetit, S.p.A., Milano, Italy
[22] Filed: Apr. 5, 1973
[21] Appl. No.: 348,364
[30] Foreign Application Priority Data
May 31, 1972 Italy.................. 25075-A/72
[52] U.S. Cl........... 260/239.3 P; 424/244; 424/249; 424/250; 424/251; 424/263; 424/269; 424/270; 424/285
[51] Int. Cl....C07d 41/00; C07d 41/06; C07d 87/54
[58] Field of Search.............................. 260/239.3 P Primary Examiner—Henry R. Jiles
Assistant Examiner—Robert T. Bond
Attorney, Agent, or Firm—Theodore Post; C. Kenneth Bjork

[57] ABSTRACT

Azine and bis-azine derivatives of 3-formylrifamycin SV of formula (I)

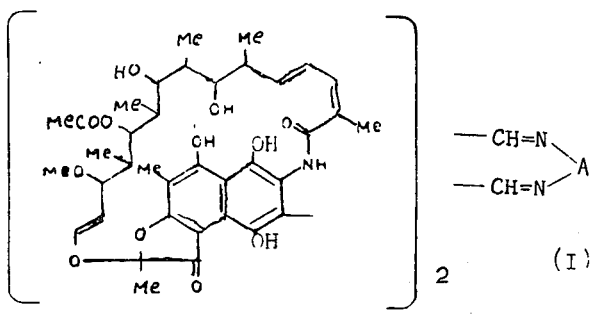

and the corresponding 25-desacetyl and 16, 17; 18, 19; 28, 29-hexahydro derivatives wherein Me is methyl; A is (1) a direct bond connecting the 2 nitrogen atoms, or (2) an

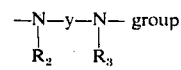

wherein $y$ is a —CO—, —CNH—, —CS—, —SO$_2$—, a divalent aliphatic, cycloaliphatic, aromatic, araliphatic or heterocyclic group, and $R_2$ and $R_3$ independently are hydrogen, lower alkyl or taken together form an aliphatic divalent chain of 1 to 4 carbon atoms connecting the two terminal nitrogen atoms or (3) a divalent

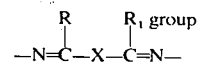

wherein X is a direct bond between the 2 carbon atoms, a divalent aliphatic, cycloaliphatic, aromatic or a heterocyclic group; and R and $R_1$ may independently be hydrogen, alkyl, cycloalkyl, aryl, heterocyclic or, taken together, form an aliphatic chain of 1 to 8 carbon atoms connecting the 2 terminal carbon atoms.

6 Claims, No Drawings

3-FORMYLRIFAMYCIN AZINES

The inventive compounds are prepared by condensing in an inert organic solvent such as, for instance, a lower aliphatic alkanol, tetrahydrofurane or dioxane 3-formylrifamycin SV or its 25-desacetyl or 16, 17; 18, 19; 28,29-hexahydro derivative with a hydrazine derivative of the formula H₂N—A—NH₂ according to the following scheme:

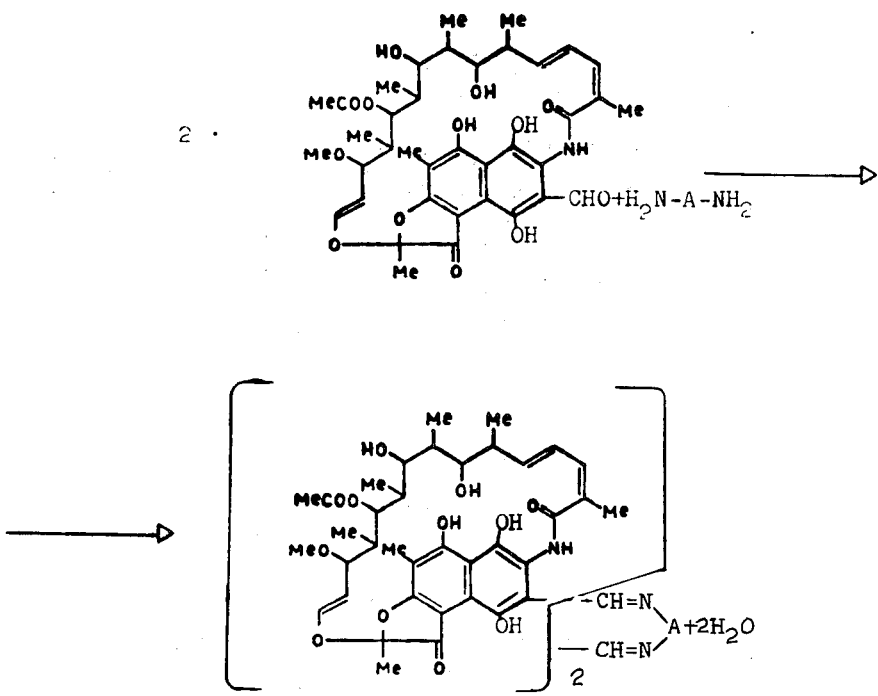

wherein A has the same meaning as above. Although theoretically the reaction requires two molar proportions of 3-formylrifamycin reactant per molar proportion of hydrazine derivative, in practice an excess of either reagent may be used without disadvantageously affecting the production of the desired product.

The inventive compounds have antibacterial activity against Gram-positive and Gram-negative bacteria.

SUMMARY OF THE INVENTION

The present invention concerns azine and bis-azine derivatives of 3-formylrifamycin SV of formula (I)

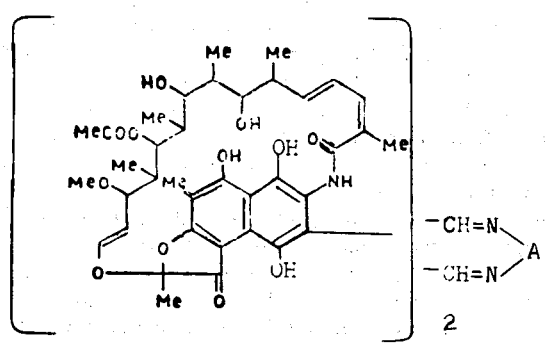

and the corresponding 25-desacetyl and 16, 17; 18, 19; 28, 29-hexahydro derivatives: wherein Me represents methyl; wherein the symbol A represents: (1) a direct bond connecting the 2 nitrogen atoms, or (2) an

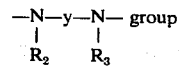

wherein $y$ represents a —CO—, —CNH—, —CS—, —SO₂—, a divalent aliphatic, cycloaliphatic, aromatic, araliphatic or heterocyclic group, and R₂ and R₃ independently represent hydrogen, lower alkyl or taken together represent an aliphatic divalent chain of 1 to 4 carbon atoms connecting the 2 terminal nitrogen atoms, or (3) a divalent

wherein X represents a direct bond between between the 2 carbon atoms, a divalent aliphatic, cycloaliphatic, aromatic, or a heterocyclic group, and R and $R_1$ may independently be hydrogen, alkyl, cycloalkyl, aryl, heterocyclic or, taken together, form an aliphatic chain of 1 to 8 carbon atoms connecting the 2 terminal carbon atoms.

In the specification and claims, the term "divalent aliphatic group" identifies an alkylene group of from 1 to 12 carbon atoms which may be straight or branched carbon chains and may also have a hydroxy, nitro or carboxy substituent group. These aliphatic chains may further contain one or more double bonds or may be formed by two segments connected through an —O—, —S—, —NH— or —SO$_2$— group. The term "cycloaliphatic divalent group" identifies a group derived from a cycloaliphatic 3- to 8-membered cyclooaliphatic ring. The term "aromatic divalent group" identifies a phenylene, biphenylene or naphthylene radical. Also, a group formed by two phenyl radicals connected through an —S—, —O—, —NH—, —SO$_2$—, —CH=CH— or an alkylene radical of 1–4 carbon atom group falls within this definition. The term "divalent araliphatic group" refers to xylylene derivatives such as for example, m-phenylenedimethylene and p-phenylenedimethylene. The term "divalent heterocyclic group" defines a mono- or binuclear 5 to 6-membered system. These groups may contain one or more hetero atoms such as N, S and O. Also in this case, a divalent group derived from a system formed by two heterocyclic groups connected through a single bond such as, for instance, bipyridine and bithiazole, or through a divalent group such as —O—, —S—, —CH=CH—, —NH—, and lower alkylene of 1 to 4 carbon atoms falls within this definition. The aromatic and/or heterocyclic moieties of the inventive compounds may carry substituents such as, for example, 1 to 4 carbon lower alkyl, halo, nitro, 1 to 4 carbon lower alkoxy, hydroxy, methylenedioxy, cyano, sulfo, carboxy and trifluoromethyl.

A general method for the preparation of the inventive compounds comprises condensing in an inert organic solvent such as, for instance, a lower aliphatic alkanol, tetrahydrofurane or dioxane, 3-formylrifamycin SV or its 25-desacetyl or 16, 17; 18, 19; 28,29-hexahydro derivative with a hydrazine derivative of the formula $H_2N$—A—$NH_2$ according to the following scheme:

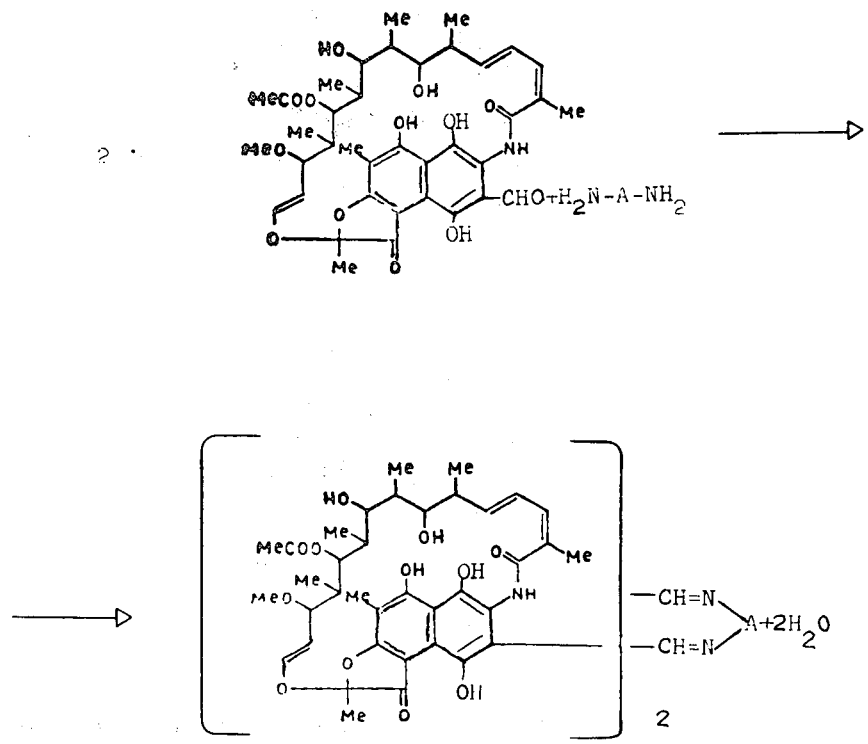

wherein A has the same meaning as above. Although theoretically the reaction requires two molar proportions of 3-formylrifamycin reactant per molar proportion of hydrazine derivative, in practice an excess of either reagent may be used without disadvantageously affecting the production of the desired product. It is understood, of course, that the use of a large excess of hydrazine derivative in the reaction medium is not advantageous, since a mono-hydrazone of the rifamycin derivative may then form instead of an azine derivative. The reaction temperature ranges between room temperature and the boiling point of the solvent medium, depending on the bulkiness of the hydrazine compound. The time of reaction varies from about 1 hour to some days, depending on the temperature of the reaction medium and the reactivity of the hydrazine compound. A longer reaction time favors the conversion of mono-hydrazonic products, which initially may form, to the desired azines. The reaction may be monitored by following the evolution of water of condensation.

The new compounds are colored solids which may be crystallized from common organic solvents such as, for example, lower alkanols, ethyl acetate, dioxane, tetrahydrofurane, benzene and liquid chlorinated hydrocarbons. The solubility of the compounds in an organic solvent obviously depends on the type and the bulkiness of the several substituents R, $R_1$ and X. When acidic functionality is present, the compounds as their alkali metal salts are also soluble in water.

The inventive compounds have antibacterial activity against Gram-positive and Gram-negative bacteria. In particular, the new class of compounds displays a remarkable activity against S. aureus strains. In this case, the minimal inhibiting concentration ranges from about 0.001 to about 0.05 μg/ml. In representative experiments in mice, amounts ranging from about 1 mg/kg to about 5 mg/kg p.o. proved highly effective in inhibiting the experimental infection from S. aureus. In other experiments, representative compounds of the invention proved to be active at doses of about 1-5 μg/ml. also against S. aureus Tour strains resistant to other rifamycins usually employed in therapeutic practice. The toxicities of the new compounds are very low and range from about 250 to about 1,500 μg/kg i.v.

Another very important feature of the inventive compounds is their inhibiting activity of DNA-polymerases which are characteristic of human leukemic blood lymphoblasts and against typical nucleotidyl transferases (polymerases) of viruses not utilized by the normal cell. It is known from studies on representative members of virus groups that they either carry or induce in the host cells polymerases as an essential part of their replication. Thus, there are viruses such as picornaviruses or polioviruses which induce RNA-dependent DNA-polymerase while other groups such as leukemia-sarcoma viruses carry an RNA-dependent DNA-polymerase. The presence and the very important role of RNA-dependent DNA-polymerase in oncogenic RNA viruses has been discovered by D. Baltimore, Nature, 226, 1209, (1970) and by H. M. Temin et al., Nature, 226, 1211 (1970).

Recent discovery of RNA-dependent DNA-polymerase enzymes in RNA tumor viruses of animal species has been confirmed by other authors, as indicated by the following papers:

Green et al.: Mechanism of carcinogenesis by RNA tumor viruses. An RNA-dependent DNA-polymerase in murine sarcoma viruses. Proc. Nat. Acad. Sci. USA 67, 385-393, 1970.

Spiegelman et al.: Characterization of the products of RNA direct DNA-polymerases in oncogenic RNA viruses, Nature, London, 227, 563, 1970.

Hatanaka et al.: DNA-polymerase activity associated with RNA tumor viruses. Proc. Nat. Aca. Sci. USA, 67, 143, 1970.

Scolnick et al.: DNA synthesis by RNA-containing tumor viruses. Proc. Nat. Acad. Sci. USA, 67, 1034, 1970.

RNA virus implication in some tumors has been supported also by other facts: reverse transcriptase has been found to be present in particles from human milk obtained from women with a familiar history of breast cancer and from inbred population. (Scholn et al. Nature, 231, 97, 1971). Priori et al. (Nature New Biology, 232, 16, 1971) isolated a virus named ESP—1 containing reverse transcriptase from cells from the pleural fluid of a child with lymphoma and have successfully grown it in tissue cultures.

The presence of RNA-dependent DNA-polymerases in some types of human tumors has been demonstrated by R. Axel et al. (Nature 235, 32, 1972) and T. W. Reid et al. (Biochem. Biophys. Res. Comm. 46, 383, 1972). At present there are no very effective drugs for treating viral diseases since viruses and cells have common metabolic requirements and pathways. The most promising approach to viral chemotherapy clearly is the design of suitable chemicals which combine specifically with viral or virus transformed cell polymerases but not with host cell polymerases controlling the expression of genetic information of viruses, and, in particular, inhibitors of polymerases of RNA tumor viruses may have an important role in providing drugs for leukemia and other cancer therapy. The inhibiting activity of the inventive compounds has been tested on RNA-dependent DNA-polymerase of endogenous murine sarcoma virus and DNA-dependent DNA-polymerase activity of purified enzymes. The inhibition was tested according to the methods described by C. Gurgo et al., Nature, New Biology, 229, 111, 1971. The effect of different concentrations of drugs on polymerase activity was determined by following $H^3dTTP$ (tritiated thymine deoxyriboside triphosphate) incorporation into the insoluble fraction. A typical example of the experimental procedures is the following:

1. ISOLATION OF VIRUS AND PURIFICATION OF VIRAL POLYMERASE

Virus was isolated and purified from murine sarcoma virus (Moloney isolate) transformed rat cells (7SA1 cells) and murine sarcoma virus (Harvey isolate) transformed mouse cells (MEH cells) as previously described (Green et al., Proc. Nat. Acad. Sci. USA, 67, 385-393, 1970; Rokutanda et al., Nature, 227, 1026-1028, 1970). The virion polymerase was purified 20-40 fold by incubation of purified virus with 0.5% NP-40 (nonidet P-40) in 0.1 M NaCl, 0.01 M Tris buffer (pH 7.6), 0.001 M EDTA for 5 minutes at room temperature and zonal centrifugation in 15 -30% sucrose gradients in 10 mM sodium phosphate buffer (pH 7.4), 2.5 mM $MgCl_2$, 10 mM dithiothreitol, and 5% glycerol for 24 hours at 38,000 rpm in a Spinco SW41 rotor. The peak fractions of enzyme activity (13-17) of 22 fractions collected, were pooled, and stored at −70°C. in 30% glycerol.

DNA POLYMERASE ASSAY

Enzyme incubations were performed for 1 hour at 37°C. in 100 μl of reaction mixture containing 40 mM Tris buffer (pH 8.0), 5 mM dithiothreitol, 30 mM NaCl, 2.5 mM $MgCl_2$, 0.1 mM dATP, dGTP, dCTP, and 10 μCi of $^3H$-dTTP (12-18 Ci/mmole) as described by Green et al., in Proc. Nat. Acad. Sci. US 67, 385-393, 1970. The reaction was terminated by the addition of 150 μl of 1N perchloric acid. Calf thymus DNA (100 μg) was added as carrier; the radioactive DNA product was processed as described in the two papers mentioned above. Endogenous RNA-dependent DNA-polymerase activity was measured after the addition of 0.01% NP-40 to purified virus at the time of assay. The DNA-polymerase activity of purified viral polymerase was measured with 2 μg of poly d(A-T) as template and no NP-40.

TEST FOR INHIBITION BY 3-FORMYLRIFAMYCIN AZINES

The compounds were dissolved in dimethyl sulfoxide (DMSO) at a concentration of 5 mg/ml and stored at 4°C. Inhibition of the endogenous RNA-dependent DNA-polymerase activity was tested by adding 2 μl of derivative appropriately diluted in DMSO or 2 μl of DMSO (control) to the assay mixture prior to addition to disrupted virus which contained 15 to 30 μg of viral protein. Enzyme incubation was performed for 60 minutes at 37°C. Inhibition of purified enzyme was tested by pre-incubation of 2 μl of derivative or DMSO with 30 μl of enzyme (1 to 2 μg of protein) for 10 minutes at 37°C.; then 70 μl of substrate mixture was added and the mixture further incubated and processed as described above.

In tests of representative compounds, the inventive compounds at a concentration of 2–100 μg/ml or less reduced the incorporation of $H^3$-dTTP to less than 10 percent of that found in the control tests, clearly demonstrating inhibition of mechanism of carcinogenesis by RNA tumor viruses according to the most recent biochemical points of view.

The inhibiting effect of reverse transcriptases has been confirmed also by tests on polymerase from murine leukemia virus. Murine leukemia virus RNA-dependent DNA-polymerase was prepared from Triton X 100 disrupted virions as described by Gallo et al. in Nature, New Biology, 232, 141, (1971). Virus of both Rauscher and Moloney types were previously purified by banding in the 1.16 g/ml region of a sucrose density gradient after initial low speed centrifugation to remove cellular debris and cushioning on 60% sucrose through 20% sucrose. Final concentration of virus preparation was at $10^{11}$ particles/ml. As template, endogenous 70S R.N.A. was used. Concentrations of 50 μg/ml or less were found to be effective in inhibiting the enzyme. Similar results were found by using tumor-cell polymerases of human origin. In this case the inhibiting activity was studied also on normal cell polymerases to characterize a selective effect. Representative rifamycin derivatives of formula (I) have been evaluated for their effects on two purified DNA-polymerases isolated from (1) human normal (PHA stimulated) blood lymphocytes, (2) a lymphoblast cell line (derived from a normal donor) and (3) human leukemic blood lymphoblast. Synthetic and/or native templates were used.

A typical example of the experimental procedure is the following:

HUMAN BLOOD LYMPHOBLASTS

Leukemic lymphoblasts were isolated from the peripheral blood of patients with acute lymphocytic leukemia (ALL) by leukophoresis. The cells were washed and erythrocytes removed by hypotonic lysis.

Normal lymphocytes were obtained from the peripheral blood from healthy donors after removal of granulocytes by nylon column chromatography. They were stimulated with phytohemagglutin (PHA) for 72 hours as described before (Gallo et al., Nature, 228, 927, 1970; Gallo et al., Science, 165, 400, 1968) in order to maximize DNA-polymerase activity. However, because of the logistics problems in obtaining sufficient amounts of these cells, a human "normal" tissue culture cell line (1788) was used to supply less purified DNA-polymerases for some of the initial survey studies. Compounds of interest were then studied in more detail with the more purified enzymes from the normal and leukemic blood lymphocytes. These tissue culture cells were obtained from Associated Biomedic Systems, Inc.

DNA-POLYMERASE PREPARATIONS

Cellular DNA-polymerases were extracted and purified from normal blood (PHA stimulated) lymphocytes, and leukemic blood lymphocytes and (1788) lymphoid cells by homogenization in hypotonic buffer followed by Triton X 100 and/or high salt extraction of the extralysosomal pellet. After differential centrifugation cellular extracts were further purified by DEAE cellulose, phosphocellulose, and Sephadex G200 column chromatography.

DNA-POLYMERASE ASSAYS

DNA-polymerase assays were carried out in a final volume of 100 μl. The assay mixture contained Tris-HCl buffer, pH 8.3, 50 mM; MgAc 6.0 mM; dithiothreitol, 8.0 mM; NaCl, 6.0 mM.

Adjustment of pH was carried out after addition of inhibitors which were previously dissolved in DMSO. The final concentration of DMSO was 0.5% and all control samples included this amount of DMSO. An enzyme concentration that catalyzes an incorporation of approximately 1.0 pmole/hour was used in the assay. The enzyme was in most cases preincubated for 5 minutes with the inhibitor. The reaction was then initiated by the addition of template, either synthetic DNA (poly d(AT) Miles Lab.) and DNA. RNA hybrid (oligo dT.poly rA), at 5 μg/ml or native templates: activated salmon sperm DNA at 50 μg/ml, and endogenous 70S viral RNA; 10 μCi of ($^3$H-methyl)-TTP (New Englander Nuclear, 18.6 mCi/μmole, lyophilized and redissolved in 0.01 M HCl just prior to usage) and dATP ($8 \times 10^{-5}$ M, with synthetic template) or all three deoxynucleoside triphosphates ($8 \times 10^{-5}$M with RNA or DNA templated reactions). In some experiments, there was no preincubation of enzyme with inhibitor. In these cases, reactions were initiated by adding enzyme to the complete reaction mixture which included the inhibitor. Samples were withdrawn at the start of incubation and after 30 minutes and terminated by the addition of 2 ml. of 0.08 M sodium pyrophosphate, and precipitated in 12.5% cold trichloracetic acid (TCA) with yeast RNA (400 μg) as carrier. The products were collected on Millipore filter, washed extensively with 5% TCA and 1 ml. of DMSO-ethanol-0.1 M NaCl mixture (0.5:70:29.5), dried and counted in 2 ml. of $BBS_3$(Beckman) and 10 ml. of liquifluor (New England Nuclear) in a Packard liquid scintillation counter. Concentrations varying from 5 to 20 ν/ml were found to provoke a 50% inhibition of leukemic polymerase with a synthetic DNA template. Reactions templated by a synthetic RNA template (poly rA.rU) were even more susceptible.

Representative experiments carried out with native template on normal and tumor cells polymerase showed a higher susceptibility of the tumor enzymes to the tested compounds.

Other biological characteristics displayed by the new rifamycin derivatives include inhibition of focus formation on mouse, rat and human cells by the Moloney and Kirsten strain of murine sarcoma virus; selective inhibition of virus production by already-transformed mouse and human cells; detection of revertant cells using the murine sarcoma virus transformed non-producer mouse and rat cell systems. The compounds of the present invention have moreover confirmed their selective toxicity for virus-transformed cells of mouse, rat and human origin when tested for colony-forming ability.

In studies to determine the effect of the novel compounds in inhibiting focus formation by Moloney sarcoma virus on BALB/3T3 tissue cultures the following procedure is employed.

BALB/3T3 cell culture are grown in 250 ml. plastic flasks in growth medium consisting of Eagle's minimal essential medium with 10% fetal bovine serum. Cell counts are made with a Coulter counter after suspending the cells with trypsin-EDTA and diluting in growth medium. Moloney murine sarcoma virus as a tumor homogenate is employed. It is passaged four times in a Swiss-derived high passage mouse embryo cell line and assayed for focus-forming units in BALB/3T3 cells. In conducting the studies, a modification of the method described by Hartley and Rowe, Proc. Nat. Acad. Sci., 55, 780 (1966) is used. In the present work, flasks are seeded with from $1-2 \times 10^6$ cells in 25 ml. of growth medium and incubated at 37°C. for 24 hours. Following the removal of fluids, virus at a predetermined number of focus-forming units is introduced into 0.5 ml. of growth medium and allowed to adsorb on the monolayer of cells for 90 minutes at 37°C. Following this adsorption period, a predetermined quantity, usually at a dose rate of from about 5 to 10 $\mu$g/ml of a 3-formylrifamycin azine compound (previously dissolved in dimethyl sulfoxide at a concentration of 1 mg/ml) and carried in 25 ml. of growth medium, is added and the cultures returned to the incubator. As a control, dimethyl sulfoxide alone in the growth medium is added to a separate culture. After three days' incubation, the cultures are fluid-changed and foci of transformed cells counted at day seven.

In this same method, vesicular stomatitis virus, New Jersey serotype is studied. Methods used to grow and assay this virus have been described by Hacket et al., Virology, 31, 114 (1967).

These properties indicate that the compounds of this invention possess an effective inhibitory activity on virus-induced tumors in animals.

DESCRIPTION OF THE PREFERRED EMBODIMENTS

The following examples describe the manner and process of making and using the invention to enable the art-skilled to make and use the same and set forth the best mode contemplated by the inventors of carrying out their invention.

EXAMPLE 1

Bis-azine of 3-formylrifamycin SV with diphenyl glyoxal

To a suspension of 15 g. (20 mmoles) of 3-formylrifamycin SV in 150 ml. of tetrahydrofuran, 4.8 g. (20 mmoles) of diphenylglyoxal dihydrazone is added. The mixture is maintained at room temperature for 16 hours and the product is recovered by filtration and crystallized from tetrahydrofuran to give a yield of 12 g. (The compound decomposes at 250°C.).

Anal. Calcd. for $C_{90}H_{104}N_6O_{24}$: C, 65.36; H, 6.34; N, 5.08. Found: C, 65.15; H, 6.35; N, 5.12.

| $\lambda$max (m$\mu$) | 528 | 348 | 307 |
|---|---|---|---|
| $E_{1 cm}^{1\%}$ | 113.4 | 258.5 | 274.8 |

EXAMPLE 2

3-Formylrifamycin SV azine

To 7.5 g. of 3-formylrifamycin SV dissolved in 150 ml. of ethanol, 0.30 ml. of hydrazine hydrate is added at room temperature. After about 1 hour, the resulting precipitate is filtered and crystallized from ethyl acetate to give 6 g. of product melting at 160°C. with decomposition.

Anal. Calcd. for $C_{76}H_{94}N_4O_{24}$: C, 63.05; H, 6.54; N, 3.87. Found: C, 62.10; H, 6.46; N, 3.95.

| $\lambda$max (m$\mu$) | 504 | 342 |
|---|---|---|
| $E_{1 cm}^{1\%}$ | 157.5 | 260.3 |

EXAMPLE 3

16, 17; 18, 19; 28, 29-Hexahydro-3-formylrifamycin SV azine

The 16, 17; 18, 19; 28, 29-hexahydro derivative of 3-formylrifamycin SV (1.5 g) is dissolved in 40 ml. of tetrahydrofuran and 50 mg. of hydrazine hydrate is added to the mixture. After 2 hours at room temperature, the solution is concentrated to dryness and the residue is dissolved in methanol. The mixture is allowed to stand at room temperature for 10 hours and the solvent is then evaporated. The residue is crystallized from methanol. Yield 600 mg. of the title product. M.p. 204–208°C. (decomposition).

Anal. Calcd. for $C_{76}H_{106}N_4O_{24}$: C, 62.53; H, 7.32; N, 3.84. Found: C, 61.96; H, 7.26; N, 3.39.

| $\lambda$max (m$\mu$) | 504 | 342 |
|---|---|---|
| $E_{1 cm}^{1\%}$ | 117 | 266 |

EXAMPLE 4

1,4-Piperazinylidene-bis-(3,3'-iminomethylrifamycin SV)

Eighty milligrams of 1,4-diaminopiperazine and 850 mg. of 3-formylrifamycin SV are dissolved in 30 ml. of tetrahydrofuran and the mixture is allowed to stand at room temperature for about 4 hours. The precipitate is recovered by filtration. Yield 640 mg. M.p. 204°–215°C.

Anal. Calcd. for $C_{80}H_{102}N_6O_{24}$: C, 62.74; H, 6.71; N, 5.49. Found: C, 62.02; H, 6.88; N, 5.62.

| $\lambda$max | 337 | 475 |
|---|---|---|
| $E_{1 cm}^{1\%}$ | 334 | 171 |

Pursuant to procedures described in the foregoing examples, other representative compounds corresponding to formula (I) are obtained by using as the starting materials 3-formylrifamycin SV or its 25-desacetyl or 16, 17; 18, 19; 28, 29-hexahydro derivative and one of the following hydrazine derivatives:

$H_2N-A-NH_2$

| A | A | A |
|---|---|---|
| -N=CH-CH=N- | -NH-CO-NH- | ![structure] |
| -N=C(CH₃)-CH=N- | -NH-CS-NH- | |
| -N=C(CH₃)-(CH₃)C=N- | -NH-CNH-NH- | |
| -N=CH-CH₂-CH=N- | -NH-SO₂-NH- | |
| -N=CH-CH₂-CH₂-CH=N- | -NH₂-CH₂-CH₂-NH- | |
| -N=C(CH₃)-CH₂-CH₂-(CH₃)C=N- | -NH-(CH₂)₅-NH- | |
| -N=C(CH₃)-(C₆H₅)C=N- | -HN-(H)-NH- | |
| -N=CH-CH₂-CH₂-CH₂-CH=N- | -HN-CH₂-⌬-CH₂-NH- | |
| -N=CH-CH₂-CH=CH-CH=N- | | |
| -N=C-⌬-C=N- with -OH groups | -HNCH₂-⌬-CH₂NH- | |

$H_2N-A-NH_2$

| A | A | A |
|---|---|---|
| (brominated bis-phenol structure with -N=C, C=N-, Br, OH) | -HN-⌬-NH- (meta) | -⌬-⌬- |
| (bis-aryl C=N structure with CF₃) | -N-(H)-N- | -⌬-⌬- |
| (bis-aryl C=N structure with OH) | -HN-⌬-NH- | -⌬-⌬- quinoline-type |
| (bis-cyclohexyl C=N structure) | tetrasubstituted benzene | trisubstituted benzene |

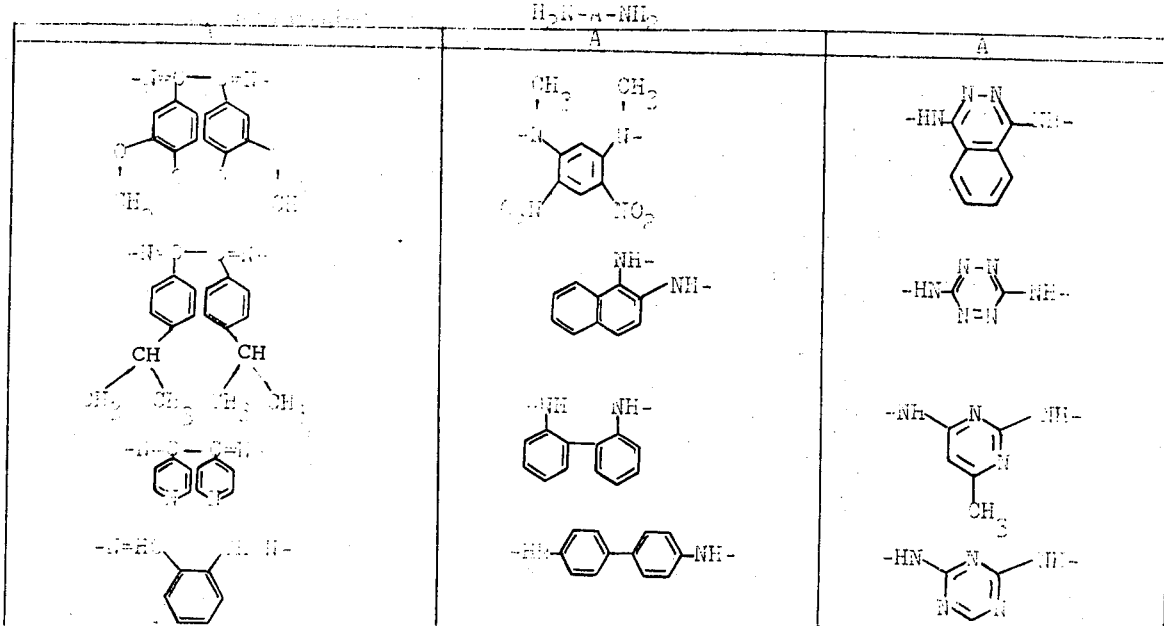
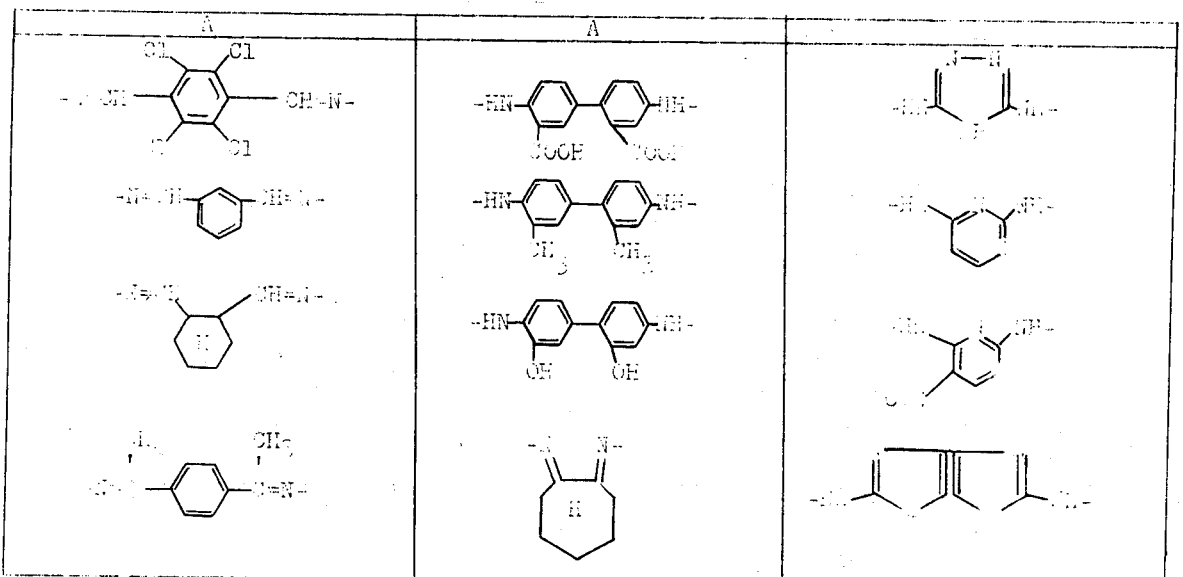
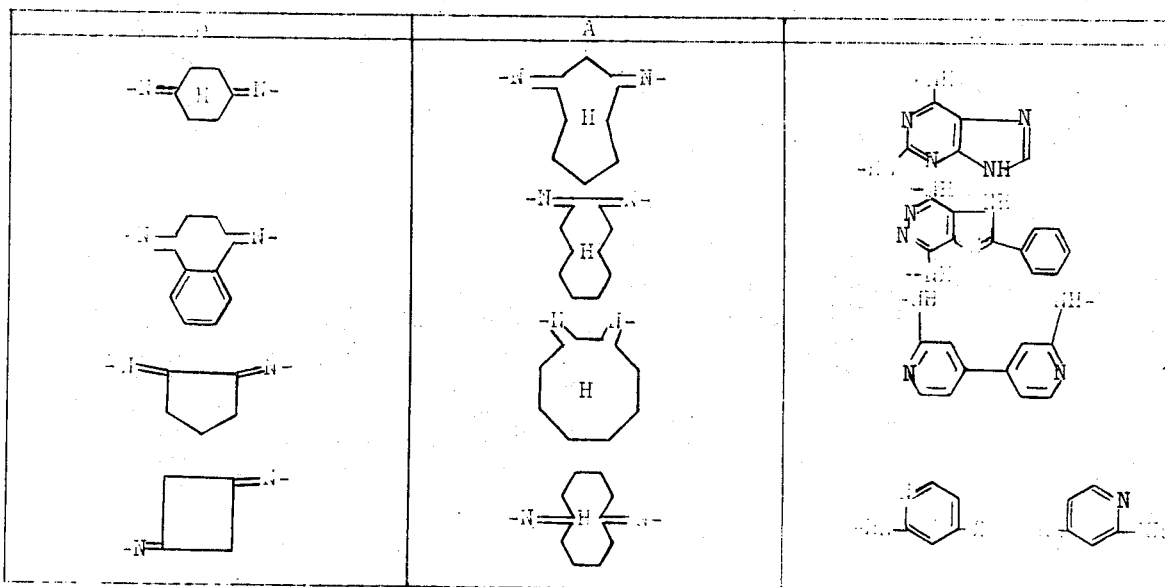

What is claimed is:
1. A rifamycin represented by the formula

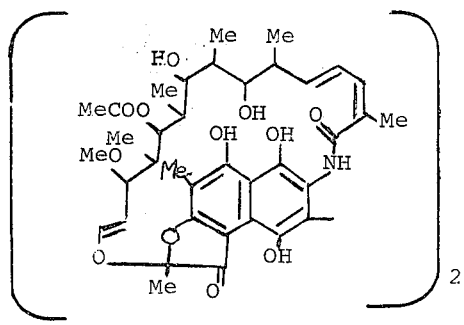
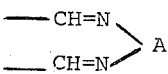

and 25-desacetyl and 16, 17; 18, 19; 28, 29-hexahydro derivatives thereof wherein: Me represents methyl; and A represents: (1) a direct bond connecting the 2 nitrogen atoms or (2)

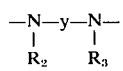

wherein y represents —CO—, —CNH—, —CS— or —SO₂— or 1 to 12 carbon atom alkylene, cycloalkylene having 3 to 8 carbon atoms, phenylene, biphenylene or naphthylene, or xylylene and R₂ and R₃ independently represent hydrogen, lower alkyl or taken together represent ethylene connecting the two terminal nitrogen atoms or (3)

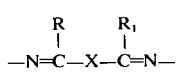

wherein X represents a direct bond between the 2 carbon atoms, 1 to 12 carbon atom alkylene, 3 to 8 carbon atom cycloalkylene, phenylene, biphenylene, naphthylene, bipyridylene or bithiazolylene and R and R₁ independently represent hydrogen, methyl, cyclohexyl, phenyl, o-hydroxyphenyl, m-trifluoromethylphenyl, 3,5-dibromo-4-hydroxyphenyl, 3-methoxy-4-hydroxyphenyl, 3,4-methylenedioxyphenyl, p-isobutylphenyl, pyridyl or taken together represent 1 to 8 C atom alkylene connecting the 2 terminal carbon atoms.

2. The compound of claim 1 which is 3-formylrifamycin SV azine.

3. The compound of claim 1 which is 16, 17; 18,19; 28,29-hexahydro-3-formylrifamycin SV azine.

4. The compound of claim 1 which is 1,4-piperazinylidene-bis-(3,3'-iminomethyl-rifamycin SV).

5. The compound of claim 1 which is the rifamycin SV diazine with diphenylglyoxal.

6. Process for preparing a rifamycin represented by the formula

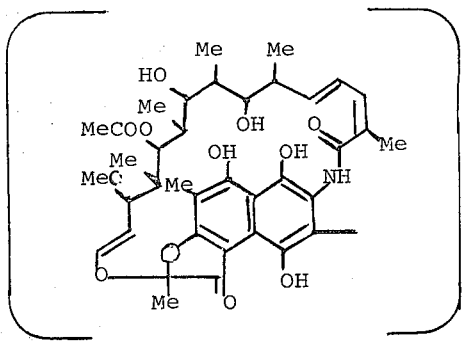
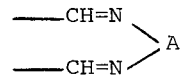

wherein Me represents methyl; and A represents: (1) a direct bond connecting the 2 nitrogen atoms or (2)

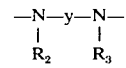

wherein y represents —CO—, —CNH—, —CS— or —SO₂— or 1 to 12 carbon atom alkylene, cycloalkylene having 3 to 8 carbon atoms, phenylene, biphenylene or naphthylene, or xylylene and R₂ and R₃ independently represent hydrogen, lower alkyl or taken together represent ethylene connecting the 2 terminal nitrogen atoms or (3)

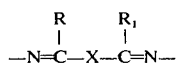

wherein X represents a direct bond between the 2 carbon atoms, 1 to 12 carbon atom alkylene, 3 to 8 carbon atom cycloalkylene, phenylene, biphenylene, naphthylene, bipyridylene or bithiazolylene and R and R₁ independently represent hydrogen, methyl, cyclohexyl, phenyl, o-hydroxyphenyl, m-trifluoromethylphenyl, 3-methoxy-4-hydroxyphenyl, 3,4-methylenedioxyphenyl, 3,5-dibromo-4-hydroxyphenyl, p-isobutylphenyl, pyridyl or taken together represent 1 to 8 C atom alkylene; which comprises condensing 3-formylrifamycin SV or its 25-desacetyl or 16, 17; 18, 19; 28, 29-hexahydro derivative with a hydrazine compound of the formula H₂N—A—NH₂ wherein A has the same meaning as above in an inert organic solvent at a temperature ranging from about room temperature to about the boiling temperature of the solvent.

* * * * *

UNITED STATES PATENT AND TRADEMARK OFFICE
CERTIFICATE OF CORRECTION

PATENT NO. : 3,900,465

DATED : August 19, 1975

INVENTOR(S) : R. Cricchio, G. Lancini

It is certified that error appears in the above-identified patent and that said Letters Patent are hereby corrected as shown below:

In the Abstract, following the formulas the word "group" is not a part of the formula as printed; but rather the continuation of a sentence and should immediately precede the word "wherein";

Column 2, line 6 & 50, the word "group" is not a part of the formula as printed; but rather the continuation of a sentence and should immediately precede the word "wherein";

Column 3, line 1, omit the word "between";

Column 3, line 48, "cyclooaliphatic ring" should read --cycloaliphatic ring--;

Column 5, line 49, "Proc. Nat. Aca." should read --Proc. Nat. Acad.--;

Column 8, line 31, "lander" should read --land--;

Column 8, line 34, "10-5" should read $--10^{-5}--$;

Column 8, line 42, "trichloracetic" should read --trichloroacetic--;

Column 9, line 37, "Hacket" should read --Hackett--;

Columns 11, 12, 13, & 14 are largely illegible, please reprint (for your convenience a copy of typed application pages 18-22 are attached).

Signed and Sealed this third Day of February 1976

[SEAL]

Attest:

RUTH C. MASON
Attesting Officer

C. MARSHALL DANN
Commissioner of Patents and Trademarks